4-21.
·18-75 OR SR
RE28340

Feb. 18, 1975 E. C. STEWART ET AL Re. 28,340

THERMOLUMINESCENT RADIATION PELLETS

Original Filed Aug. 22, 1966 2 Sheets-Sheet 1

INVENTORS
ELMER C. STEWART
WILLIAM S. FOULKS, JR.
BY Walter J. Moracelli
ATTORNEY INVENTORS
ELMER C. STEWART
WILLIAM S. FOULKS, JR.
BY Walter J. Monacelli
ATTORNEY United States Patent Re. 28,340
Reissued Feb. 18, 1975

28,340

THERMOLUMINESCENT RADIATION PELLETS

Elmer C. Stewart, Highland Heights, and William S. Foulks, Jr., Chagrin Falls, Ohio, assignors to Kewanee Oil Company, Bryn Mawr, Pa.

Original No. 3,532,777, dated Oct. 6, 1970, Ser. No. 574,227, Aug. 22, 1966. Application for reissue Oct. 5, 1972, Ser. No. 295,285
Int. Cl. C09k *1/00*
U.S. Cl. 264—21 9 Claims

Matter enclosed in heavy brackets [ ] appears in the original patent but forms no part of this reissue specification; matter printed in italics indicates the additions made by reissue.

ABSTRACT OF THE DISCLOSURE

This [division] *invention* comprises pellets adapted to be made thermoluminescent upon exposure to radiation and the process of preparing such pellets by the steps of pressing a powder of a thermoluminescable material such as lithium fluoride, calcium fluoride, etc., at a pressure of at least 10,000 p.s.i. while at a temperature in the range of room temperature to 825° C., said pressure being at least 200,000 p.s.i. and having a progressively higher minimum pressure when temperatures less than 200° C. are used. Such pellets are adapted for use in thermoluminescent dosimeters for measurement of radiation dosages.

This invention relates to pellets adapted for use in a thermoluminescent dosimeter. More specifically, it relates to thermoluminescable pellets, such as thermoluminescable lithium fluoride pellets, etc. suitable for this purpose. More specifically, it relates to a method of converting an anisotropic or non-uniform thermoluminescable powder, such as activated-lithium fluoride, activated-calcium fluoride, etc. to isotropic or uniform activated lithium fluoride, etc.

As a precaution against being exposed to more radiation than can be safely tolerated, persons exposed, either intentionally or unavoidably, to ionizing radiation of various types generally carry a device for measuring the amount of radiation to which they are exposed.

Sometimes this exposure is measured by carrying on the person a photographic negative which is eventually developed to show the amount of exposure. This method has various well-known disadvantages. Accordingly the use of a thermoluminescable powder offers advantages. One of the most advantageous is activated lithium fluoride. Such thermoluminescable powders have the ability to absorb radiation equivalent to the amount to which the person is exposed. Since a portion of the energy of this radiation is accumulated, it is tested periodically to determine the radiation exposure.

The method of testing the accumulated radiation is based on the fact that when the powder is heated it emits light of an intensity in proportion to the amount of radiation accumulated. Instruments have been developed which can measure the amount of light thus emitted and translate this information to give a reading in roentgens of radiation to which the material has been exposed.

While other materials can be used for this purpose, it has been found that activated lithium fluoride has a number of advantages over these other materials, most important of which is the fact that lithium fluoride has a more uniform response to radiation over a wider range of energy levels than these other materials such as calcium fluoride, silver activated phosphate glass, and even a photographic negative.

Moreover, activated lithium fluoride more closely resembles human tissue in its response to ionizing radiation.

For this purpose lithium fluoride has an effective atomic number for photo electric absorption of 8.14, as compared to 7.42 for tissue and 7.64 for air. In contrast, glass rod dosimeters have effective atomic numbers from 15 to 30, calcium fluoride 16.5 and film approximately 40. Moreover, lithium fluoride is inert, insoluble, non-toxic and has excellent long-term dose storage properties.

One of the effective methods for preparing the lithium fluoride for this purpose, is to have one or more activators, such as described hereinafter, to assist the lithium fluoride in this function. The activator must be in very intimate contact with the lithium fluoride and must be uniformly distributed therethrough. It has been the practice to add the activator to molten lithium fluoride and then allow the lithium fluoride to crystallize under conditions which promote the formation on one large crystal. In this way the activator becomes distributed throughout the crystal lattice and is very effective in its function of activating the lithium fluoride in radiation absorption.

Various activators for lithium fluoride and the method of incorporating them in the crystal lattice by crystal growth are described and claimed in copending application Ser. No. 322,248 filed by Carl F. Swinehart on Nov. 7, 1963.

However, while it would be desirable to cut from the large crystal, small pieces of the activated lthium fluoride for use in a dosimeter to determine the amount of radiation exposure, it has been found that the activator is not uniformly distributed throughout the crystalline lithium fluoride and therefore a piece cut from one part of the crystal would not be uniform in radiation absorption and resultant light emission as compared to a piece cut from another portion of the same crystal. For this reason, it has been found desirable to grind the crystal to a powder, advantageously to a particle size of less than 80 mesh (Tyler), and to blend the resultant powder with itself until the total mixture has attained a uniformity with respect to the distribution of activator in the lithium fluoride. The activator is still contained in the crystal lattice of the lithium fluoride, but the powdering and blending operation has converted the lithium fluoride from the anisotropic form found in the large crystal to an isotropic, more uniform form in the blended powder.

While the powder has been found suitable for use in thermoluminescent dosimeters, there are various disadvantages to its use in this form since it requires careful weighing to obtain the appropriate standard amount used for test purposes. Moreover, the powder must be used in a container, and there is always the risk of spilling or losing some of the powder. Furthermore, variations in the spreading of powder in the dosimeter can cause variations in readings, etc. Still furthermore, in the use of thermoluminescent powders there is a considerable amount of tribothermoluminescence or "noise" which is extraneous to the "signal" being measured.

While the above discussion relates to the preferred lithium fluoride thermoluminescable material, it pertains also to the various other thermoluminescable materials, such as calcium fluoride, calcium sulfate, etc.

In an attempt to avoid the disadvantage of using such thermoluminescable materials in powder form, attempts have been made to prepare wafers of the thermoluminescable powder suspended in a plastic. This is often undesirable since it is impossible to obtain entirely satisfactory results or uniformity from wafer to wafer in thermoluminescent properties usually because of thermal degradation or physical changes.

In accordance with the present invention, it has now been found that this powder can be pelletized *either* by extrusion or *by* hot pressing under appropriate temperature and pressure conditions followed by suitable slicing or cutting operations to produce pellets of standard or uniform size and properties suitable for use as a thermoluminescent dosimeter. Most surprisingly it has been found that [extreme] temperature and pressure conditions generally used in these pelletizing operations do not destroy the thermoluminescent properties of these materials and in some cases improves the signal to "noise" ratio.

Moreover, it has been found that with appropriate conditions of pressure and temperature it is possible to start with individual powders of lithium fluoride or calcium fluoride, etc. and their respective activators in appropriate particle size, and after uniformly blending the mixture of powders, to pelletize the mixture according to the conditions described herein to produce a pellet having the lithium fluoride and the activator in such intimate contact as to effect thermoluminescable properties previously attainable only by crystal growth in a molten salt-activator mixture. Apparently the temperature and pressure conditions used *either* to extrude or *to* press the mixture incorporates the activator into sufficiently intimate contact with or within the lithium fluoride crystal lattice to give the thermoluminescable properties. This latter method has the obvious advantage of eliminating the melting and crystal forming steps.

In *either* the compressing or extruding operation used in producing the pellets of this invention, it is desirable to use powders of lithium fluoride and of the activator having a particle size of less than 0.1 inch in dimension, advantageously 80–200 mesh (Tyler) or smaller. If the powder is one formed by crushing or grinding a lithium fluoride crystal in which the activator has already been added to molten lithium fluoride prior to crystallization, as described above, then a separate activator powder will not be added.

The powder is *either* compressed or extruded into a bar. and subsequently cut into pellets of the desired size. Advantageously the extruded or pressed product has a square cross-section, although other cross-section shapes, such as rectangular, diamond or circular also can be used. The *either* pressed *or extruded* bar [or extrusion], or even the pellet itself, is advantageously polished to give a smooth surface. It is also advantageous to have the corners of the square cross-section, etc. slightly rounded, particularly with extrusion products since the frictional drag during extrusion sometimes causes roughness or openings along the sharp edges.

In the polishing operation referred to above, this is performed uniformly on each rod, ribbon, or pellet so as to equalize the small amount of material removed in the polishing operation. In any case, there is not a sufficient loss of material as to create sufficient variations of weight that might alter or make non-uniform the thermoluminescent properties when eventually used in the dosimeter.

Moreover the pellets can be produced of a standard size to be used in a measuring instrument calibrated for that particular size. A particularly advantageous size is one having a square cross-section, preferably with rounded corners, the dimension of each size of the square being 0.060–0.065 inch and the length being 0.5 cm. Another convenient size, with approriate change in calibration of the instrument is a pellet having the same cross-section as above and a length of one cm.

In *either* the pressing or extruding operation, a dry, inert atmosphere is advantageously used to avoid any bad effect the moisture in air may have on the thermoluminescable properties at the raised temperatures generally used. Consequently, the pressing mold or extruder is generally either evacuated or swept with an inert gas, such as nitrogen, argon, etc. and after the powder has been added, an atmosphere of inert gas is maintained with the temperature being appropriately raised.

Moreover, the product is advantageously extruded into an inert atmosphere which is maintained until the temperature of the material has been lowered to room temperature. Likewise in the pressing operation, the material in the die advantageously is kept in the inert atmosphere until the temperature of the material has reached room temperature. As previously stated, the [extruded] [or pressed] product, *whether extruded or pressed,* is cut to desired dimensions. If needed or desired, the product is polished before or after the cutting to remove any surface discontinuities.

This process produces a large number of transparent or translucent pellets of standard size, all normalized and made isotropic starting with an anisotropic activited lithium fluoride, or a mixture of lithium fluoride and an activator, or other activated thermoluminescent powder as described above.

In the drawings, FIG. 1 is a plan view of an extruder taken at line 1—1 in FIG. 2.

Figure 1:
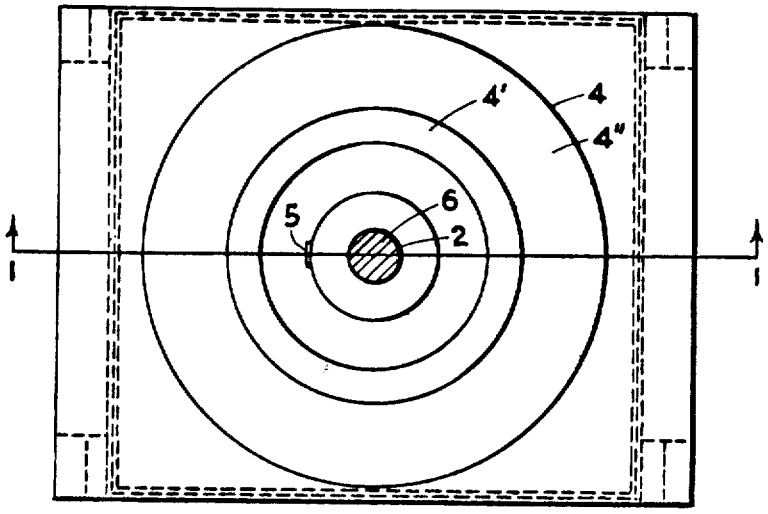
Figure 2:
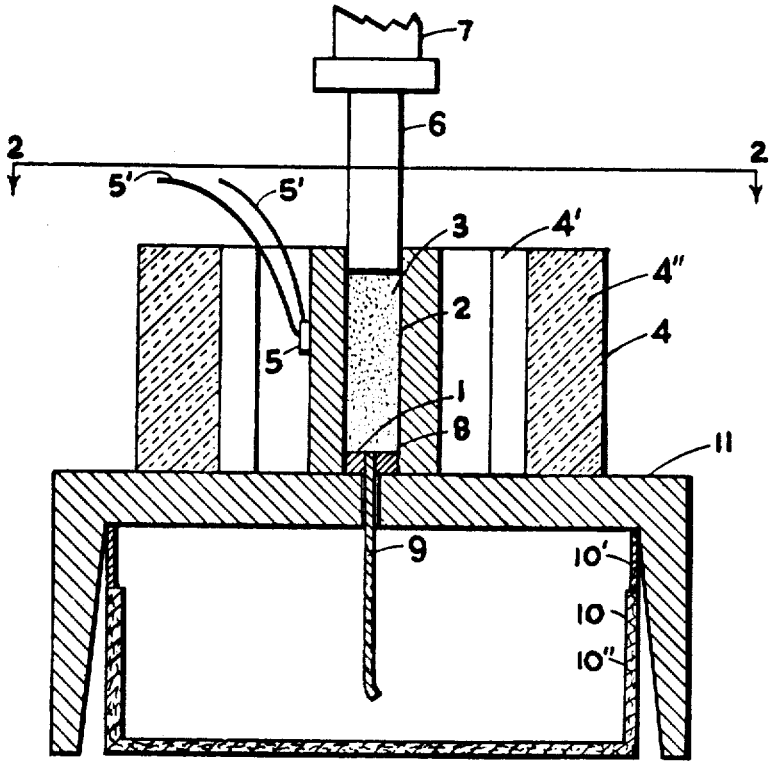
FIG. 2 is a front elevational cross-sectional view of the same extruder taken at line 2—2 of FIG. 1.

In the views of FIGS. 1 and 2, the extruder main body 1 has a well 2 filled with powder. The base of the well is an insert plug 8 which has an orifice 8'. Plug 8 is designed to fit tightly into the bottom of well 2 but can be removed for cleaning purposes by raising the extruder main body 1 and forcing piston 6 all the way through well 2. The plug 8 can also be removed for replacement by a plug having a different size orifice.

This extruder is surrounded by furnace 4 which has the heating elements 4' adjacent to the extruder main body 1 and the exterior of the furnace covered by insulation 4''. Thermocouple 5 with lead wires 5'' is affixed to the outer surface of extruder main body 1. After the powder has been heated for a sufficient period for it to reach the desired temperature, the piston 6 is forced by means of plunger 7 of the hydraulic press (not shown) to the interior of well 2, thereby extruding the contents of the well through the orifice 8' to give the extrudate 9. The die and furnace are supported by table 11 which has an opening under the die for passage of this extrudate. This extrudate enters box 10 which in the upper section is made of transparent plastic 10' and the lower portion is cardboard 10'' lined on the inside with aluminum foil so that the extrudate will touch only metal. A nitrogen source (not shown) maintains a nitrogen atmosphere in the interior of box 10. To facilitate manipulation and cutting of the extrudate, a door (not shown) is provided.

Figure 3:
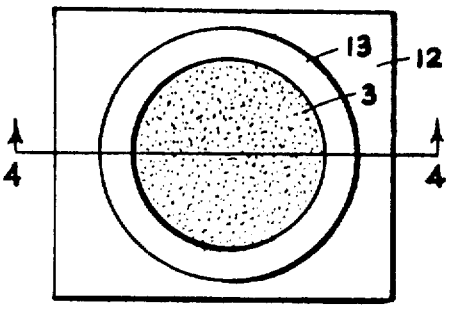
FIG. 3 is a plan view of direct compression equipment comprising a ring containing compressed powder for direct compression taken at line 3—3 of the view shown in FIG. 4.
Figure 4:
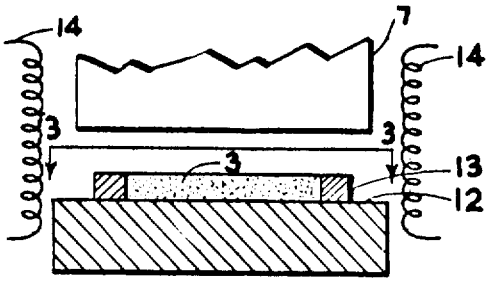
FIG. 4 is a front elevational view of the compressing equipment shown in FIG. 3 and taken at line 4—4 of that view.
Figure 5:
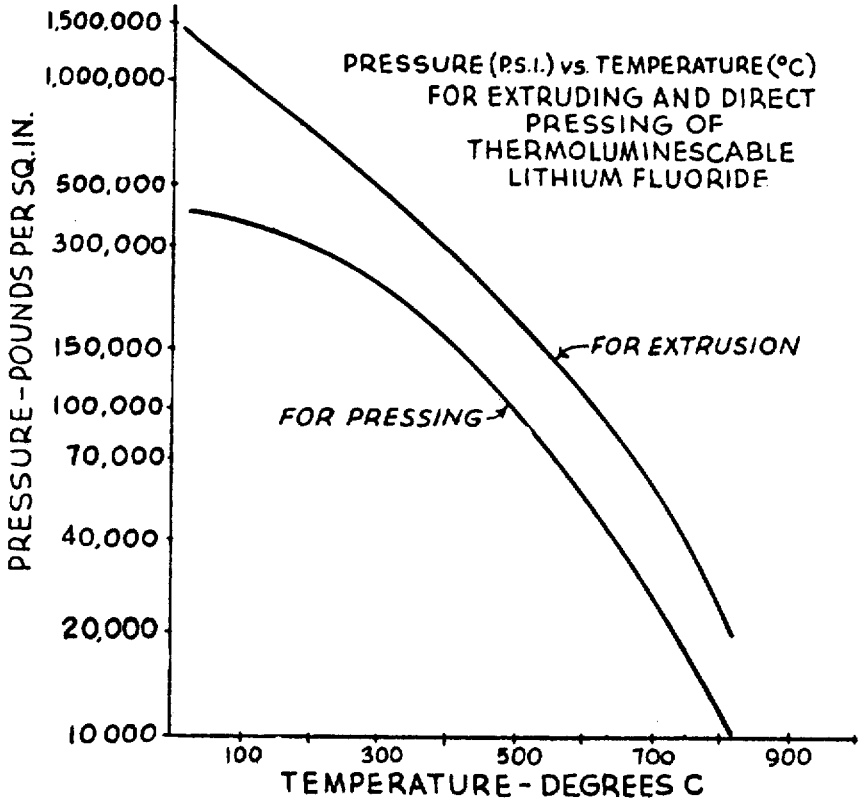
FIG. 5 shows two curves plotted to represent the minimum pressures that can be used at various pressures, one curve representing values for extrusion and the other for direct pressing. The pressures are plotted on logarithmic scale.

FIGS. 3 and 4 show equipment used in a preferred method of making compressed discs for cutting into pellets according to this invention. In FIG. 3, the ring 13 having either a square or rectangular annular cross-section as shown in FIG. 4 has its interior filled with compacted powder. This ring is preferably of stainless steel or steel. The ring and its contents are supported on support block 12. After the ring and its contents are heated to the desired temperature by heating element 14, as determined by a thermocouple which is not shown, the plunger 7 is applied to ring 13 and the powder 3 with sufficient force to compress the steel of the ring. By simultaneously compressing the ring and the powder, a more uniform pressure is exerted throughout the powder contained in the ring. The ring is found to flow outwardly in such a manner that both the inner diameter and the outer diameter of the ring are increased by the compression.

It is believed that the pressure exerted on the powder is transmitted to the inner wall of the ring, thereby causing it to expand and likewise causing the outer diameter to expand. In this way the steel ring is compressed to about ⅔ or ½ of the original height of the ring. As a result of the increase of the inner diameter of the ring and the accompanying increase in area within the ring, the "pressure" decreases during the pressing operation when a constant force is applied throughout by the plunger 7. The resultant disc of compressed powder can be pushed out from the interior of the ring and recovered easily for subsequent treatment. This disc is polished and then cut into desired pellet size. For direct compression, this method is preferred since the method of recovering the disc is simplified.

It is also possible to make a compression disc using the equipment of FIG. 2 but using, in place of the die 8 which has an orifice therein for extrusion purposes, a plate of approximately the same thickness as die 8 but having no orifice therein.

After the desired degree of compression has been exerted on the powder in well 2, using only sufficient powder to give the desired thickness of compressed disc, the pressure is released so that the main body 1 can be raised from the supporting table 11 and supported in such a manner that there is no barrier below disc 8 which will prevent its being pushed from well 2 when the pressure is reapplied at the top of the compacted powder above the die 8. In this way, both the die 8 and the compacted powder disc are pushed from well 2.

The particular temperature and pressure used in pressing a product according to this invention, either in extrusion or in direct pressing, can vary over a wide range, with the selection of the temperature and the pressure being interdependent upon each other. For example, in the lower portion of the temperature range cited herein, it is desirable to use pressures in the higher portion of the cited pressure range. Thus, if the room temperature is to be used in an extrusion, this is advantageously done with a pressure of about 1.5 million p.s.i. If higher temperatures are selected, the pressure for obtaining practical rates *either* of extrusion, or *of* compression in the case of pressed products will be reduced accordingly.

Generally, however, the temperature range is from room temperature to 825° C. for either compressing or extruding. The pressure range for extrusion is advantageously 20,000 p.s.i. up to 1.5 million p.s.i. or more depending on the temperature and desired rate of extrusion. In compressing operations, pressures in the range of 10,000 up to 1.5 million p.s.i. or more can be used. For example at room temperature a pressure of at least 400,000 p.s.i. should be used, and at 825° C. pressures as low as 10,000 p.s.i. can be used. Generally, extrusion requires greater pressures than for direct compression of product at equivalent temperatures. Furthermore, with smaller extrusion orifices, it is desirable to use greater pressures.

In commercial operations using *thermoluminescable* lithium fluoride, it is preferable to use a temperature of about 700° C. for extrusion, and a pressure of 50,000–65,000 p.s.i. The higher temperatures allow faster extrusion rates and better transparency in the product. For direct compression, a practical commercial temperature is 250°–300° C. with pressure about 300,000 p.s.i.

For *thermoluminescable* calcium fluoride, a very practical set of conditions for direct compressing to transparent products is 600° C. and 100,000 p.s.i. In extruding *thermoluminescable* calcium fluoride, higher pressures are advantageous than for lithium fluoride. Similar conditions are used for *thermoluminescable* calcium sulfate pressings and extrusions as used for *thermoluminescable* calcium fluoride.

The following table illustrates the variations in the temperatures and pressures for extrusion of activated lithium fluoride:

| | Minimum pressure, p.s.i. | Pressures suitable for practical extrusion rate, p.s.i. |
|---|---|---|
| Temperature, ° C.: | | |
| 550 | 100,000 | 133,000 |
| 650 | 90,000 | 120,000 |
| 700 | 40,000 | 50,000 |
| 825 | 15,000 | 20,000 |

When using thermoluminescent powders as described herein, there is a considerable amount of tribothermylluminescence, or "noise" due to false radiation. The "noise" generally refers to the effects produced other than the desired signal or type of radiation or light emission which it is pressed, the pressing effects an improvement truding of the powder may reduce the thermoluminescity a small degree as compared to that of the powder from which it is pressed, the pressieng effects an improvement in the ratio of thermoluminescence to noise. This means that a considerable amount of the tribothermylluminescence or noise is eliminated so that a truer signal can be read in the testing equipment.

The pellets of this invention have the advantage of being easier to handle and use than a powder. The pellets are also transparent or at least translucent. Another advantage is the fact that the pellets produce a high signal to noise ratio as shown in the electronic circuit measuring the [like] *light* quantity. This is a considerable advantage since it permits more accurate measurement and permits measurement at lower energy levels.

The invention is best illustrated by the following examples. These examples are given merely for illustrative purposes and it is intended that neither the scope of the invention nor the method in which it may be practiced is to be limited in any manner by these examples. Unless specifically provided otherwise, parts and percentages are given by weight.

EXAMPLE I

An extrusion of thermoluminescable powder is performed using the equipment shown in FIGS. 1 and 2 with an activated lithium fluoride as prepared in Example I of the above-mentioned copending application and containing 400 parts of magnesium fluoride, 200 parts of lithium cryolite and 55 parts of lithium fluotitanate per million parts of lithium fluoride. The powder has a particle size of 80–200 mesh (Tyler). Prior to the insertion of the powder into the extruder, the space in the well is swept free of moist air by feeding a stream of dry nitrogen into the bottom of the well and maintaining a nitrogen atmosphere during and after the addition of the powder. The well has a diameter of [0.775"] *0.75"* and a depth of 6" above the plug or die 8. The orifice has a cross-section 0.06 inch square. The well is filled with powder which is compacted to approximately ¾ of the height of the well. Then the piston is lowered into position to rest upon the compacted powder. Heat is applied to the extruder and the extruder kept at a temperature of 550° C., according to the reading of the thermocouple affixed to the main body of the extruder, for a period of two hours to insure that the powder has attained a uniform temperature. Force is then applied to the plunger of the hydraulic press such that a pressure of 100,000 p.s.i. is applied *at the surface of* [to] the powder. In 15 minutes an extrudate length of about 3 inches is obtained. The pressure is raised to 133,000 p.s.i. which increases the rate of extrusion to about ⅓ inch per minute. In about 1.5 hours a length of about 22 inches is extruded. Various samples of about ½ inch long are cut and polished on two parallel sides. These are clear and transparent and when placed upon printed material it is possible to read the print through the material. The cross-section is approximately 0.06 inch square and lengths of 0.5 cm. are cut for testing. Each sample is exposed to 100 rads of gamma radiation having an energy level of about 300 Kev. The thermoluminescence of each sample so treated is measured using a reading system analogous to the "Research Reader" described in an article by G. N. Kenny et al., Rev. Sci. Ins., 34, No. 7,769 (1963). In each case, the thermoluminescence is easily read and found to be approximately identical, which shows that the thermoluminescence is a true indication of the amount of radiation received. Similar results are obtained when the radiation is X-ray, or alpha or beta-rays, and when the radiation dosage is varied.

EXAMPLE II

The procedure of Example I is repeated using a temperature of 700° C. and a pitson pressure of 60,000 p.s.i. Excellent results are obtained upon radiation and testing of luminescence of the resultant samples as in Example I. Satisfactory results are also obtained with the following variations in temperature and pressures:

650° C. and 120,000 p.s.i.
825° C. and 20,000 p.s.i.
250° C. and 550,000 p.s.i.

EXAMPLE III

The procedure of Example I is repeated using an orifice having a cross-section of 0.09 inch square.

EXAMPLE IV

The procedure of Example I is repeated a number of times using in place of the activated lithium fluoride of that example a number of activated lithium fluorides prepared according to the procedure of the said copending application and containing per million parts of lithium fluoride, the following activator compositions:

(a) 400 parts calcium fluoride, 200 parts lithium cryolite, and 55 parts lithium fluotitanate;
(b) 400 parts barium fluoride, 200 parts lithium cryolite, and 55 parts of lithium fluotitanate;
(c) 400 parts magnesium fluoride, 200 parts lithium cryolite and 50 parts europium fluoride;
(d) 400 parts magnesium fluoride, 200 parts lithium cryolite, 55 parts lithium fluotitanate and 25 parts of europium fluoride;
(e) 40 parts magnesium fluoride, 20 parts lithium cryolite and 42 parts of lithium fluotitanate;
(f) 40 parts barium fluoride, 60 parts lithium cryolite and 50 parts europium fluoride;
(h) 40 parts calcium fluoride, 50 parts lithium cryolite and 50 parts lithium fluotitanate;
(i) 200 parts magnesium fluoride, 100 parts lithium cryolite and 60 parts lithium fluotitanate;
(j) 400 parts magnesium fluoride, 30 parts lithium cryolite and 55 parts lithium fluotitanate;
(k) 300 barium fluoride, 20 parts lithium cryolite and 42 parts lithium fluotitanate; and
(l) 40 parts magnesium fluoride, 80 parts barium fluoride, 200 parts lithium cryolite and 42 parts lithium fluotitanate.

In each case satisfactory results are obtained upon testing the resultant pellets with radiation and thermoluminescence as described in Example I.

EXAMPLE V

The procedure of Example I is repeated using instead of the grown crystal of lithium fluoride and the various activators described, mixtures of the lithium fluoride and the activators as they are used prior to melting for subsequent crystal growth. Instead these activators are added to the lithium powder as such and placed in the extruder well. The resultant pellets have a substantial amount of thermoluminescent properties when radiated and tested according to the procedure of Example 1. Thermoluminescent pellets are also obtained when the lithium fluoride is mixed with the various activators described in Example IV, but without using the crystal growth technique. After radiation, a substantial amount of thermoluminescence is found in each case when tested as in Example I.

EXAMPLE VI

The procedures of Examples I–III are repeated, using an activated-calcium fluoride powder as prepared in "Atomic Energy Review," p. 23 vol. 3 (1966), pp. 84–86, having approximately 3 mole percent of manganous fluoride as the activator.

Upon cutting and radiating as described in Example I the resultant pellets exhibit satisfactory thermoluminescent properties.

EXAMPLE VII

The procedures of Examples I–III are repeated using an activated calcium sulfate powder, prepared as described in "Atomic Energy Review," vol. 3 (1966), pp. 92–93, containing approximately 1 percent manganous sulfate. Similar results are obtained as in Example VI.

EXAMPLE VIII

A compressed disc is made using the activated-lithium fluoride powder of Example I and equipment as shown in FIGS. 3 and 4. A stainless steel ring is used having an inner diameter of 0.53 inch, an outer diameter of 0.63 inch, and the annular section having a rectangular cross-section 0.25 inch high and 0.05 inch wide. The powder is cold pressed in a nitrogen atmosphere at a pressure of 100,000 p.s.i. to form a disc ⅜ inch high which will just fit into the interior of the ring. The ram of the hydraulic press is brought to rest on the top of the ring and powder. With a thermocouple attached to the exterior of the ring, heat is applied and the temperature maintained for 1 hr. 40 minutes at 220° C. to make sure that the mass of powder is uniformly heated. Then a pressure of 320,000 p.s.i. is applied for 2 minutes to the ring and powder at which time the ring has been reduced to a thickness of 0.125 or approximately ½ the original height. Then the compressed ring and pressed powder disc are removed from the equipment and the powder disc separated from the ring. When the disc is removed from the ring, it has clear top and bottom surfaces and is transparent. It is cut into a number of pieces 2 mm. x 2 mm. x 10 mm. Before radiation, the respective pieces are heat-treated at 400° C. for 90 mm. and 20 hours at 80° C. The various samples are simultaneously raidated to a dose of 100 rads of X-ray. The thermoluminescence is tested as in Example I and found to show excellent thermoluminescence properties and reproducible results as shown by the proximity of reading values obtained from the respective samples.

EXAMPLE IX

The procedure of Example VIII is repeated with satisfactory results using the following variations in temperatures and pressures in the pressing operation:

(a) room temperature and 700,000 p.s.i.;
(b) 300° C. for one hour, hot-pressed one hour at 225,000 p.s.i., and cooled one hour at 50° C.; and
(c) 600° C. and 46,000 p.s.i.

EXAMPLE X

The procedure of Example VIII is repeated a number of times using respectively the various activated-lithium fluorides of Example IV. Satisfactory results in thermoluminescence are obtained in each case upon testing as in Example I.

EXAMPLE XI

The procedure of Example VIII is repeated with satisfactory result at 650° C. and 325,000 p.s.i. when activated calcium fluoride of the type used in Example VI is used as the powder.

EXAMPLE XII

The procedure of Example VIII is repeated with satisfactory resuls, except that activated calcium sulfate of the type used in Example VII is used as the powder.

EXAMPLE XIII

The procedure of Example VIII is repeated at 650° C. and 325,000 p.s.i. using, instead of the powder of those examples, a mixture of calcium fluoride and activator as used in Example VI having particle sizes in the range of 80–200 mesh. Satisfactory thermoluminescence properties are obtained when tested as in Example I.

As indicated above, the extruded or compressed product is preferably clear and transparent, particularly after the surfaces are polished. This is desirable for maximum transmission of light during thermoluminescence. However, even with translucent products there is sufficient light transmission to make the products suitable for the purposes of this invention.

With regard to the extrusion operations described herein, the size of the orifice in the extrusion die is not critical so long as it permits a sufficient buildup of the pressure required to give the necessary compaction for producing transparent or translucent product. This particular pressure will vary according to various factors such as temperature, particle size, type of powder, etc. as discussed above. Generally, however, it has been found advantageous to have an orifice having its dimensions in the range of 0.04 to 0.120 inch, preferably about 0.06 inch.

While certain features ofthis invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A process for preparing pellets adapted to be made thermoluminescent upon exposure to radiation comprising the step *either* of pressing *or extruding* a powder of a thermoluminescable material at a pressure of at least 10,000 p.s.i. while at a temperature of at least room temperature and no higher than 825° C., said pressure being [at least 400,000 p.s.i. when said temperature is in the range of room temperature to 100° C., at least 300,000 p.s.i. when said temperature is in the range of 100° to 200° C., and at least 200,000 p.s.i. when in the range of 200–300° C.] *less than 1.5 million p.s.i., greater pressures being required at lower temperatures.*

2. A process of claim 1 in which said powder is predominantly of a particle size smaller than 80 mesh Tyler.

3. A process of claim 1 in which said powder is predominantly of a particle size in the range of 80 to 200 mesh Tyler.

4. A process of claim 1 in which said pressure and said temperature are effected on said powder during extrusion of said powder, and the resultant extrudate is cut into desired pellet size, said temperature being at least 200° *C.* [and said pressure being at least 100,000 p.s.i.]

5. A process of claim 1 in which said powder is thermoluminescable lithium fluoride.

6. A process of claim 5 in which said temperature is about 700° C. [and said pressure is about 50,000–65,000 p.s.i.]

7. A process of claim 1 in which said powder is thermoluminescable calcium fluoride.

8. A process of claim 1 in which said powder is a mixture of lithium fluoride and an activator for making said lithium fluoride thermoluminescable.

9. A process of claim 1 in which said powder is a mixture of calcium fluoride and an activator for making said calcium fluoride thermoluminescable.

References Cited

The following references, cited by the Examiner, are of record in the patented file of this patent or the original patent.

UNITED STATES PATENTS

| | | | |
|---|---|---|---|
| 2,994,109 | 8/1961 | Thomas | 264—111 |
| 3,141,973 | 7/1964 | Heins | 252—301.4 |
| 3,282,855 | 11/1966 | Palmer | 252—301.4 |
| 3,312,759 | 4/1967 | Letter | 264—332 |

U.S. Cl. X.R.

250—71; 252—301.4; 264—109, 332

THEODORE MORRIS, Primary Examiner